United States Patent
Kano et al.

(10) Patent No.: US 9,134,876 B2
(45) Date of Patent: Sep. 15, 2015

(54) INFORMATION PROCESSING DEVICE AND METHOD FOR DISPLAYING A WINDOW BASED ON A PRIORITY OF THE WINDOW

(75) Inventors: Izua Kano, Tokyo (JP); Kazuhiro Yamada, Tokyo (JP); Dai Kamiya, Tokyo (JP); Yasushi Onda, Tokyo (JP); Keiichi Murakami, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 270 days.

(21) Appl. No.: 12/811,838

(22) PCT Filed: Dec. 16, 2008

(86) PCT No.: PCT/JP2008/072878
§ 371 (c)(1),
(2), (4) Date: Jul. 7, 2010

(87) PCT Pub. No.: WO2009/087871
PCT Pub. Date: Jul. 16, 2009

(65) Prior Publication Data
US 2010/0281423 A1    Nov. 4, 2010

(30) Foreign Application Priority Data
Jan. 7, 2008 (JP) ................................. 2008-000643

(51) Int. Cl.
*G06F 3/048* (2013.01)
*G06F 3/0481* (2013.01)

(52) U.S. Cl.
CPC .... *G06F 3/0481* (2013.01); *G06F 2203/04803* (2013.01)

(58) Field of Classification Search
CPC ........ G06Q 20/027; G06Q 30/06; G06F 8/36; G06F 3/0481
USPC ................................................... 715/794, 796
See application file for complete search history.

(56) References Cited

U.S. PATENT DOCUMENTS 5,479,497 A * 12/1995 Kovarik ........................ 715/788
5,493,692 A *  2/1996 Theimer et al. .............. 455/26.1
(Continued)

FOREIGN PATENT DOCUMENTS

| EP | 583206 A1 * | 2/1994 | ............. G06F 3/033 |
| JP | 05-011960 A | 1/1993 | |

(Continued)

OTHER PUBLICATIONS

Salber et al., "The Context Toolkit: Aiding the Development of Context-Enabled Applications", Proceedings of CHI '99, May 15, 1999.*

(Continued)

*Primary Examiner* — Jennifer To
*Assistant Examiner* — Joseph R Burwell
(74) *Attorney, Agent, or Firm* — MKG LLC

(57) ABSTRACT

An information processing device stores a window of an application and designation information for designating an external device associated with the window. The information processing device detects an external device located near the information processing device, and when multiple windows are displayed having an overlapping portion the information processing device identifies an external device associated with the multiple windows. Next, the information processing device determines whether there is a window associated with the detected external device, and if the window(s) exists the information processing device displays the window or any one of the windows in the foremost position.

4 Claims, 8 Drawing Sheets

(56) References Cited

U.S. PATENT DOCUMENTS

| | | | |
|---|---|---|---|
| 5,544,321 A * | 8/1996 | Theimer et al. | 709/226 |
| 5,555,376 A * | 9/1996 | Theimer et al. | 709/229 |
| 5,603,054 A * | 2/1997 | Theimer et al. | 710/6 |
| 6,532,488 B1 * | 3/2003 | Ciarlante et al. | 709/205 |
| 7,146,193 B2 * | 12/2006 | Shitahaku | 455/566 |
| 7,257,777 B1 * | 8/2007 | Kanevsky et al. | 715/794 |
| 7,280,851 B2 * | 10/2007 | Oba et al. | 455/566 |
| 2004/0095401 A1 * | 5/2004 | Tomimori | 345/864 |
| 2005/0138077 A1 * | 6/2005 | Michael et al. | 707/104.1 |
| 2005/0235214 A1 * | 10/2005 | Shimizu et al. | 715/864 |
| 2005/0278654 A1 * | 12/2005 | Sims | 715/790 |
| 2006/0190838 A1 * | 8/2006 | Nadamoto | 715/781 |
| 2007/0180401 A1 * | 8/2007 | Singh et al. | 715/794 |
| 2007/0245256 A1 * | 10/2007 | Boss et al. | 715/768 |
| 2008/0078831 A1 * | 4/2008 | Johnson et al. | 705/39 |
| 2009/0138811 A1 | 5/2009 | Horiuchi et al. | |
| 2009/0210497 A1 * | 8/2009 | Callanan et al. | 709/206 |
| 2009/0288036 A1 * | 11/2009 | Osawa et al. | 715/794 |
| 2010/0115461 A1 * | 5/2010 | Onda et al. | 715/790 |
| 2010/0169826 A1 * | 7/2010 | Keereepart et al. | 715/794 |

FOREIGN PATENT DOCUMENTS

| | | | |
|---|---|---|---|
| JP | 08-161139 | 6/1996 | |
| JP | 8-292758 | * 11/1996 | G06F 3/14 |
| JP | 09-258992 | 10/1997 | |
| JP | 10-198627 | 7/1998 | |
| JP | 2003144756 | 5/2003 | |
| JP | 2005-242686 | 9/2005 | |
| JP | 2005-301890 | 10/2005 | |
| JP | 2007102751 | 4/2007 | |
| WO | 2007-052382 A | 5/2007 | |

OTHER PUBLICATIONS

Chou et al., "BlueSpace: Creating a Personalized and Context-Aware Workspace", IBM Research Report RC22281, Dec. 11, 2001.*

Fox et al., "Integrating Information Appliances into an Interactive Workspace", IEEE Computer Graphics and Applications, v. 20, n. 3, pp. 54-65, May 2000.*

Intille et al., "Designing a Home of the Future", IEEE Pervasive Computing, v. 1, n. 2, pp. 76-82, Apr. 2002.*

Voida et al., "Supporting Activity in Desktop and Ubiquitous Computing", Beyond the Desktop Metaphor: Designing intergrated digital work environments, Kaptelinin and Czerwinski (Eds.), pp. 195-222, 2007.*

"How to Set Up a Bluetooth Proximity System", http://www.novell.com/coolsolutions/feature/18684.html, Feb. 22, 2007.*

Brown, "The stick-e document: a framework for creating context-aware applications", Electronic Publishing, v. 8, n. (2 & 3), pp. 259-272, (Jun. & Sep. 1995).*

Dey et al., "CyberDesk: A Framework for Providing Self-Integrating Context-Aware Services", Proceedings of the 3rd International Conference on Intelligent User Interfaces (IUI '98), pp. 47-54, 1998.*

Finney et al., "FLUMP: The FLexible Ubiquitous Monitor Project", 1996.*

Want et al., "The Active Badge Location System", ACM Transactions on Information Systems, v. 10, n. 1, pp. 91-102, Jan. 1992.*

Want et al., "An Overview of the ParcTab Ubiquitous Computing Environment", IEEE Personal Communications, pp. 28-43, Dec. 1995.*

Weiser, "The Computer for the 21st Century", Scientific American, v. 265, n. 3, pp. 94-104, Sep. 1991.*

Japanese Office Action for JP2008-000643 dated May 24, 2011.

Office Action with English Translation, Mailing Date—Sep. 20, 2011, issued in conjunction with JP Patent Application No. 2008-000643.

Japanese Decision of Rejection for JP2008-000643 dated Jan. 10, 2012.

Supplemental Search Report for European Application No. 08869689.3-2224/2249236 dated Apr. 2, 2012.

Communication pursuant to Article 94(3) for European Application No. 08869689.3-2224 dated Apr. 25, 2012.

Office Action from corresponding Japanese Application No. 2012-088057, dated Mar. 12, 2013.

* cited by examiner

FIG. 3

| ID | DEVICE INFORMATION | PROPERTY |
|---|---|---|
| 001 | MOBILE PHONE A | OPPONENT |
| 002 | MOBILE PHONE B | COLLEAGUE |
| 003 | MOBILE PHONE C | COLLEAGUE |
| 004 | MOBILE PHONE D | COLLEAGUE |
| 005 | MOBILE PHONE E | COLLEAGUE |
| 006 | MOBILE PHONE F | COLLEAGUE |
| 007 | READER/WRITER | NONE |
| 008 | WIRELESS HEADPHONE | NONE |

FIG. 4

| APPLICATION NAME | DEVICE INFORMATION | ORDER |
|---|---|---|
| GROUPWARE | MOBILE PHONE B TO F | 1 |
| INTERACTIVE GAME | MOBILE PHONE A | 3 |
| ELECTRONIC PAYMENT APPLICATION | READER/WRITER | 2 |
| MUSIC PLAYER | WIRELESS HEADPHONE | 4 |

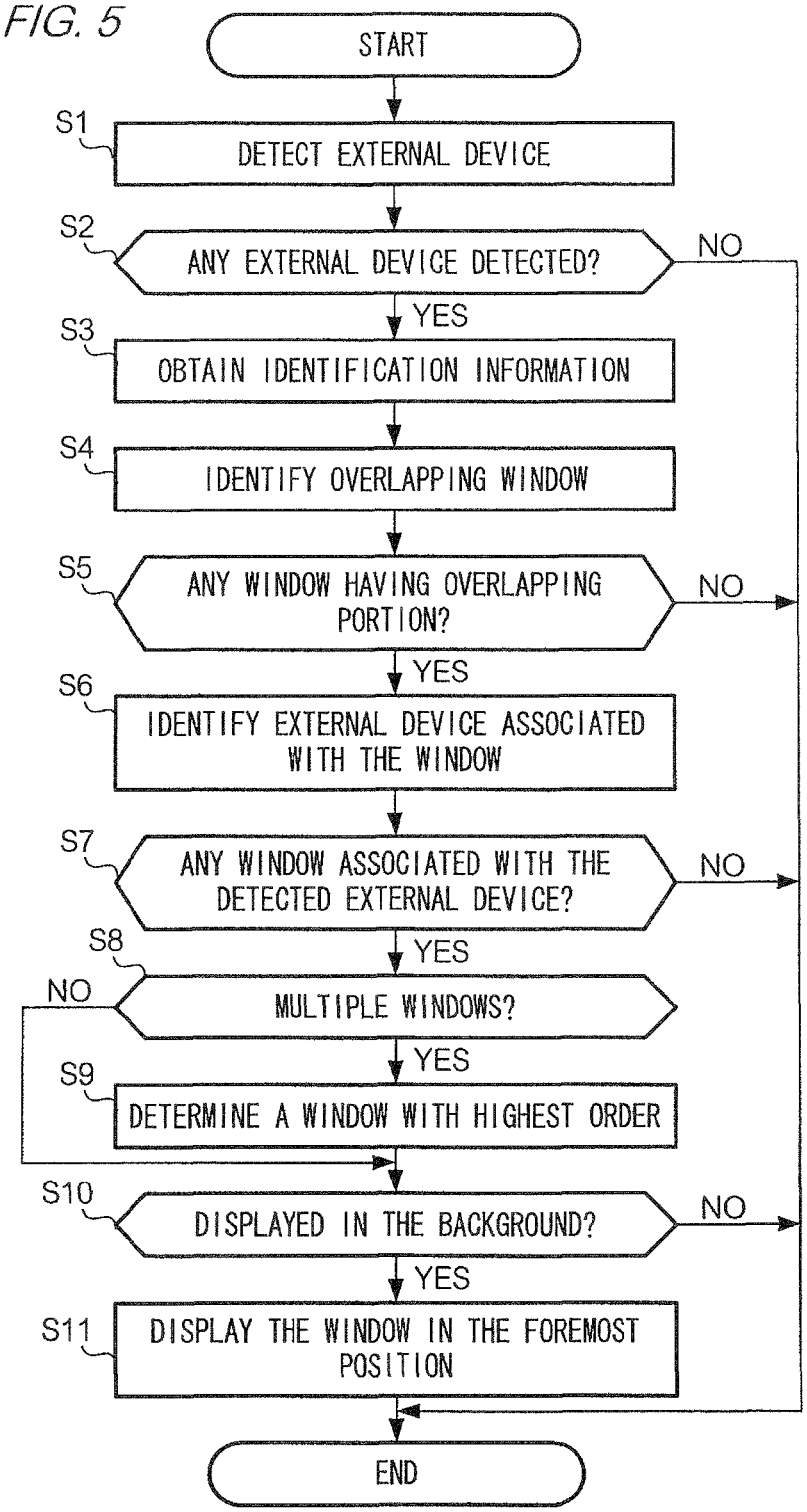

| APPLICATION NAME | DEVICE INFORMATION | TIME PERIOD | ORDER |
|---|---|---|---|
| GROUPWARE | MOBILE PHONE B TO F | 9:00~18:00 | 1 |
| INTERACTIVE GAME | MOBILE PHONE A | 18:30~23:00 | 3 |
| ELECTRONIC PAYMENT APPLICATION | READER/WRITER | 18:30~O23:00 | 2 |
| MUSIC PLAYER | WIRELESS HEADPHONE | 0:00~24:00 | 4 |

| WINDOW | ASSOCIATION EXISTS? | ORDER | PRIORITY |
|---|---|---|---|
| wa | YES | 4 | 2 |
| wb | YES | 6(LOWEST) | 3 |
| wc | YES | 3 | 1(HIGHEST) |
| wd | NO | 1(HIGHEST) | 4 |
| we | NO | 5 | 6(LOWEST) |
| wf | NO | 2 | 5 |

INFORMATION PROCESSING DEVICE AND METHOD FOR DISPLAYING A WINDOW BASED ON A PRIORITY OF THE WINDOW

TECHNICAL FIELD

The present invention relates to a GUI (Graphical User Interface).

BACKGROUND

A technology used for control of display of multiple overlapping windows is described in Japanese Patent Application No. JP H08-161139A, published on Jun. 21, 1996 to Mitsubishi Electric Corp. According to the description in JP H08-161139A, when at least two windows are displayed on a display screen such portions of the windows overlap, a window displayed in the foreground is interchanged with a window(s) displayed in the background at predetermined time periods. A length of time for which respective windows are displayed in the foreground is dependent upon a length of time for which a particular window is used.

SUMMARY

In general, it can be assumed that a window designated for display in a foreground is the window that a user intends to work within (is working within?). Thus, if after a set period of time a window displayed in the foreground is moved to the background, a situation may arise where, depending on a work style of a user, a window displayed in the foreground after the set period of time has passed may not be the window required by the user. An object of the present invention is to enable window display switching by an external device detected by the information processing device.

An information processing device according to the present invention comprises: a detecting section that detects an external device; an obtaining section that obtains identification information for identifying the external device; a designating section that designates identification information of a window displayed on a display; an identification section that identifies a window overlapping with another window displayed on the display; a determination section that determines priority levels of a plurality of windows identified by the identification section, such that a priority level of a window for which identification information of the external device obtained by the obtaining section is designated by the designation section is higher; and a display controller that displays windows with a higher priority level determined by the determination section, in front of windows with a lower priority level determined by the determination section. The information processing device according to the present invention may further comprise: a time determining section that determines a time, and a time specifying section that specifies a time period for a window displayed on the display, wherein when the time period specifying section specifies a time period including a time determined by the time determining section for a window, for which the identification information of the external device detected by the detecting section is designated by the designating section, the determination section accords to the window a priority level higher than a priority level accorded to the window in a case that the time determined is not included in the time period.

In the information processing device according to the present invention, the identification information may include information on a property of the external device; and when the number of external devices detected by the detecting section is greater than a predetermined number and the detected external device has the same property, the determination section may accord a window for which the identification information including the property is accorded a priority level higher than priority levels accorded to others of the designated windows.

The information processing device according to the present invention, may further comprise: a communication section that communicates with the external device; and a notification section that notifies the external device via the communication section, wherein, the communication section obtains identification information from the external device; and when identification information is designated by the designation section for a window having the highest priority level among the priority levels determined by the determination section, the notification section notifies an external device from which the identification is obtained.

The information processing device according to the present invention may further comprise a window designation section that designates a window, wherein when the window designated by the window designation section is included in the designated plurality of windows, the display controller displays the window in the foremost position.

A program according to the invention causes a computer to execute the steps of: detecting an external device; obtaining identification information for identifying the external device; designating the identification information of a window displayed in a display; identification of a window overlapping another window being displayed in the display; determining priority levels of a plurality of windows identified by the identification section, such that a priority level of a window for which identification information of the external device obtained by the obtaining section is designated by the designation section is higher; and displaying windows with a higher priority level determined by the determination section, in front of windows with a lower priority level determined by the determination section.

According to the present invention, it is possible to switch windows displayed on a screen by way of an external device that is detectable by the information processing device.

BRIEF DESCRIPTION OF THE DRAWINGS

FIG. 3 shows an example of identification information;

FIG. 4 shows an example of designation information;

FIG. 5 is a flowchart showing an operation of the information processing device;

DETAILED DESCRIPTION

Figure 1:
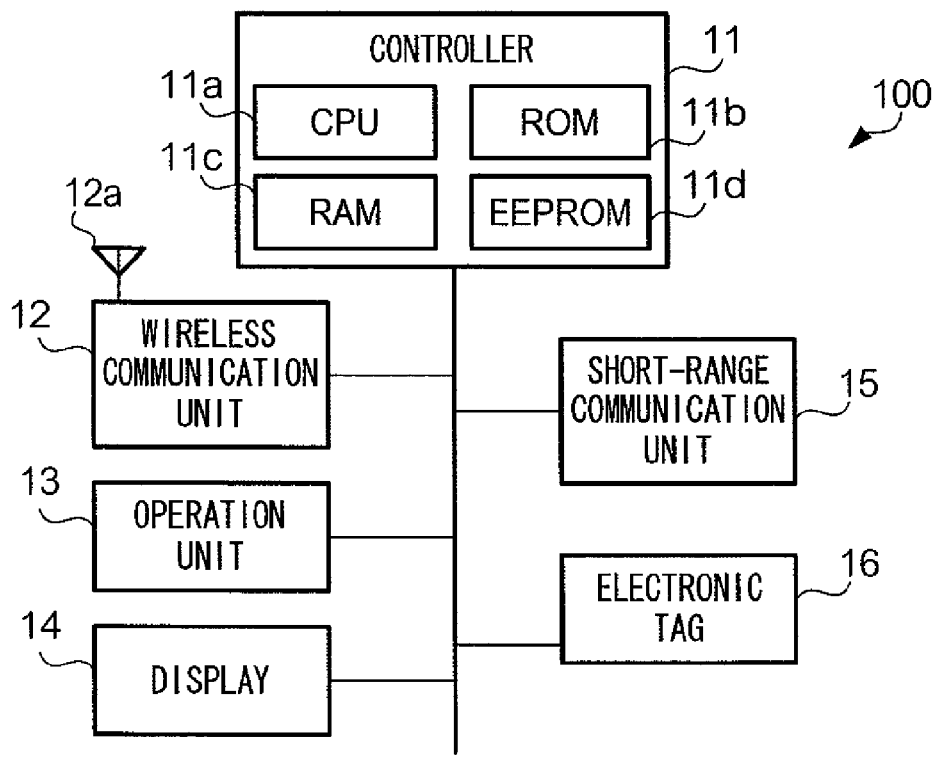
FIG. 1 is a block diagram showing a configuration of an information processing device according to the present invention.

FIG. 1 is a block diagram illustrating the overall configuration of an information processing device according to a first exemplary embodiment of the present invention. As illustrated in the figure, an information processing device 100 includes a controller 11, a wireless communication unit 12, an input unit 13, a display 14, and a short-range wireless communication unit 15, and an electric tag 16. In the present exemplary embodiment, it is assumed that the information processing device 100 is a mobile phone.

A controller 11 includes a CPU (Central Processing Unit) 11a, ROM (Read Only Memory) 11b, RAM (Random Access Memory) 11c, and EEPROM (Electronically Erasable and Programmable ROM) 11d. In the controller 11 the CPU executes programs stored in the ROM 11b and EEPROM 11d using a RAM 11c as a work area of the CPU 11a, to control operation of information processing device. A wireless communication unit 12 includes antenna 12a to perform wireless data communication via a predetermined mobile communication network. An input unit 13 includes an input device having a button or the like and supplies a control signal to the controller 11 acceding to an operation of a user. A display 14 includes a liquid crystal display and driving circuit thereof, for display of an image according to display data supplied by the controller.

The short-range wireless communication unit 15 is an interface that performs wireless communication with external devices located within a redeemed distance from the information processing device 100. It is possible to determine a range of the wireless communication of the short-range wireless communication unit 15 based on a target external device(s) to access and as to how to the access is performed. For example, the range is designed to be a few centimeters to tens of centimeters. The short-range wireless communication unit 15 performs communication with an external device in compliance with a predetermined wireless communication standard. The predetermined wireless communication standard may be Bluetooth® or IrSimple. A wireless communication standard may be employed depending on an external device used and on a manner of use of the external device. In the present exemplary embodiment external devices that are able to communicate with the short-range wireless communication unit 15 include a mobile phone and wireless headphones. The wireless headphones consist of an external device that outputs sound based on audio data input via radio.

An electronic tag 16 is an interface and includes an electronic tag such as an RFID (Radio Frequency Identification) for performing wireless communication with a reader/writer, which may be one of the external devices used. The electronic tag 16 is configured to communicate with the reader/writer when a distance between them is reduced to a predetermined value. In the present exemplary embodiment the electronic tag 16 performs electronic payments based on data stored in advance.

The ROM 11b has several programs that are pre-stored therein. These programs are referred to below as "pre-installed programs." Specifically, the pre-installed programs include programs such as a multi-task operating system (hereinafter referred to as a "multi-tasking OS"), a Java® platform, and a native application. The multi-tasking OS is an operating system that supports various functions, such as allocation of virtual memory space required for implementing TSS (Time-Sharing System)-based pseudo-parallel execution of multiple tasks. The Java platform is a group of programs that comply with the Connected Device Configuration standard (CDC), which is a configuration used, in this example, to implement the Java Runtime Environment 114 (described hereinafter) on the information processing device 100 having installed therein a multi-tasking operating system (OS). The native application is a program that implements basic services including a call connection service.

The EEPROM 11d has a Java application storage area where Java applications are stored. The Java applications have JAR (Java Archive) files, wherein actual programs describing processing procedures under the Java Runtime Environment are bundled together with audio files and image files used in conjunction with the execution of the programs, and Application Descriptor Files (ADFs), which provide a description of the installation, startup, and various attributes of the JAR files. The Java applications are written by a content provider or by a telecommunication service provider, and are stored on an external server or the like for download responsive to a request made by the information processing device 100.

Figure 2:
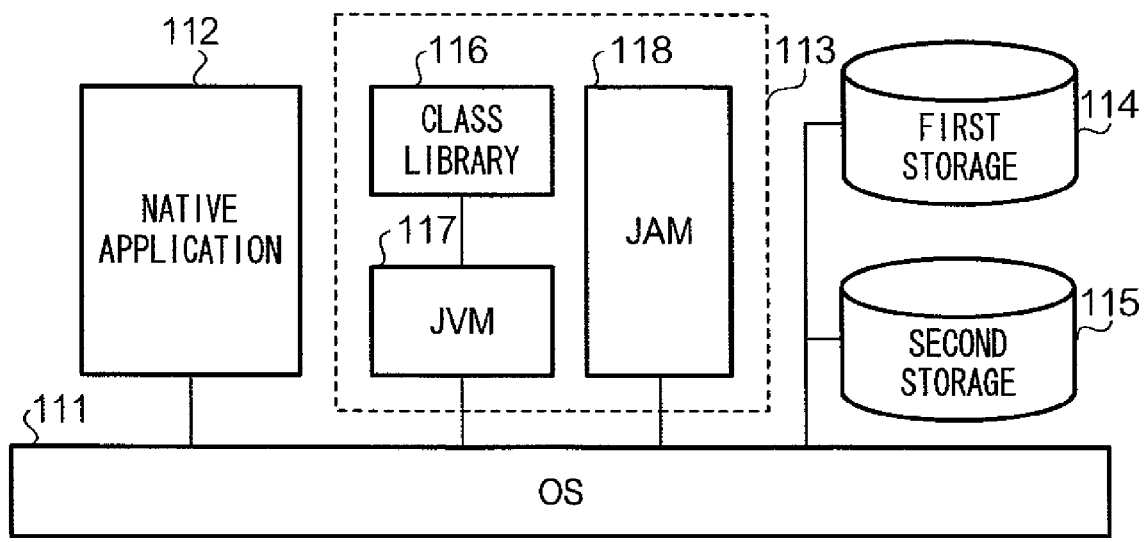
FIG. 2 shows a logical configuration of an information processing device.

FIG. 2 shows the logical configuration of the components implemented by the controller 11 of the information processing device 100, wherein various programs stored in the ROM 11b and EEPROM 11d are executed. As illustrated in FIG. 2, the information processing device 100, which is used to run various programs, has a native application 112 and a Java Runtime Environment 113 implemented in an OS 111, and, in addition, a first storage 114 and a second storage 115 are provided in the EEPROM 11d.

The Java Runtime Environment 113 is implemented using a Java platform of the ROM 11b. The Java Runtime Environment 113 includes a Class Library 116, a JVM (Java Virtual Machine) 117, and a JAM (Java Application Manager) 118. The Class Library 116 is obtained by bundling a group of program modules (classes) with specific functionality into a single file. The JVM 117, which is a Java Runtime Environment optimized for the above-mentioned CDC, has a function of interpreting and running a bytecode supplied in the form of Java applications. The JAM 118 has a function of managing the downloading, installation, startup, shutdown etc. of Java applications.

The first storage 114 is an area used for storing Java applications (Jar files and ADFs) downloaded under the management of the JAM 118. The second storage 115 is an area used for storing data produced during execution of the Java applications after their shutdown, with individual storage areas being allocated to each installed Java application. In addition, data in storage areas allocated to particular Java applications can be re-written only when the Java applications are running; and rewrites by other Java applications are prohibited.

The information processing device 100 stores an interactive game application and groupware, each of which is a Java application. The interactive game application is an application that enables a user to play a game with an opponent by communicating with the opponent's mobile phone, which is an external device, via short-range wireless communication unit 15. The groupware is an application designed for implementation in an office environment by which users in the office are able to share information. The groupware includes functions of displaying schedules of the users and a so-called electronic bulletin board for writing information relating to daily work.

The native application 112 includes a music player and an electronic payment application. The music player is an application that controls reproduction of audio data. The music player provides the functions of decoding coded audio data, which is stored in advance or received by the wireless communication unit 12, and outputting to the short-range wireless communication unit 15. The electronic payment application is an application that performs the function of the electronic payment described above. The electronic payment application controls communication between a reader/writer provided at an electrical shop or the like and the electronic tag 16, to exchange data representative of a monetary value referred to as "an electronic value." When a user purchases goods or services, the electronic payment application deducts an amount for the goods or services from the stored electronic value and rewrites the electronic value to add an amount of money when the user adds credit to the payment application.

All of the applications described above have a function of displaying windows on the display 14. For example, the interactive game application causes a window to display a content of a game and the music player displays a window by which an instruction for selection of music data, initiation of reproduction, or stop of reproduction can be implemented. The electronic payment application causes a window to display the balance of the stored electronic value.

The EEPROM 11d stores identification information and designation information together with the data described above. The identification information is information representative of an external device communicable with the information processing device 100. The designation information is information representative of external devices associated with the applications described above. Since each application displays content in a predetermined window on the display 14, the designation information can be considered to be information, which specifies an external device associated with a window in which results of a process by an application are displayed.

FIG. 3 shows an example of the identification information according to the exemplary embodiment. As shown in the same figure, the identification information is data representative of association between an ID and device information for each application executable by the controller 11. The identification information also includes information on properties of a part of the external devices. An ID is information uniquely assigned to each external device by the information processing device 100. For example, the ID is a character string or a number generated under a predetermined rule. The device information is information representative of an external device communicable with the information processing device 100. For example, the device information may represent a type (reader/writer, wireless headphone or the like) of an external device as shown in the same figure. Alternatively, the device information may include detailed information such as a model number or a serial product number. For example, the information will necessarily include information unique to each mobile phone communicable with the information processing device 100 in a case where each mobile phone must be distinguishable from other mobile phones.

This property consists of information representative of characteristics of an external device, and is used as a basis for grouping external devices. For example, "Property" described in a same figure is information representative of a classification of mobile phones. Specifically, mobile phones are classified as "colleague" or "opponent." A "colleague" refers to a person working in an Office at which a user of the information processing device 100 works. Thus, a mobile phone identified by the identification information is one that is owned by a user's colleague. An "opponent" refers to a person involved in playing the interactive game application stored in the information processing device 100. Thus, a mobile phone identified by such identification information is one that is owned by an opponent active in the game.

The device information of an external device may be obtained when communication with the external device is initiated. A notification of initiation of communication by an interface can be regarded as device information if the interface is capable of distinguishing an external device such as a reader/writer from other external devices when communicating. In this case, since initiation of communication by the electronic tag 16 enables the controller 11 to obtain a notification, the notification can be employed as the device information.

FIG. 4 shows an example of designation information according to the present exemplified embodiment. As shown in the figure, the designation information is data in which an "application name," "device information," and "order" are associated with each other. "Application name" is information used for identifying applications. For example, the "application name" may be a name of an application or a location (address or directory) of a storage device that stores an application. "Device information" may be information representative of an external device associated with an application. A part of the device information consists of the identification information. "Order" is represented by a value allocated to a window corresponding to an application. The values may be determined based on a frequency or duration of displaying a window corresponding to an application, or a user's preferences.

In addition, in the present exemplary embodiment, the term "window" refers to a display area allocated to an application when the application implements predetermined functions. As used herein, these display areas may be of any shape and appearance and need not be square or rectangular-shaped windows. For ease of description, however, the display areas are assumed to be rectangular-shaped windows as shown in the drawings below. In a case where multiple windows are displayed so that one window overlaps another, only the window in the foreground is visible in its entirety and the portion of the other window that is overlapped by the window in the foreground remains concealed. The position of a window, part of which is concealed by a window located in front of it, is referred to as "background" relative to the foreground.

Designation information shown in FIG. 4 means: that "groupware" is associated with "mobile phones B to F," i.e., mobile phones owned by colleagues; and "interactive game application" is associated with "mobile phone A, i.e., a mobile phone owned by an opponent. Additionally, designation information means that "electronic payment application" is associated with "reader/writer" and "music player" is associated with "wireless headphones."

The configuration of the information processing device 100 is as described above. By this configuration, the information processing device 100 runs multiple applications in response to user requests. At such time, the user performs a prescribed operation on the operator input unit 13 to request that an application be executed by the information processing device 100.

When running multiple applications, the information processing device 100 is capable of displaying multiple windows corresponding to the respective applications. At such time, the information processing device 100 displays the windows using the so-called overlapping-window technique. Namely, in response to a user's instructions, the information processing device 100 can shift the display positions of the windows, which makes it possible to display multiple windows in an overlapped fashion. In order to do this, the controller 11 of the information processing device 100 stores information (hereinafter referred to as "window information") concerning the position and sequence, in which the multiple windows are displayed, with this information updated whenever the windows shift. It should be noted that, as used herein, the term "window display sequence" refers to the order in which the windows would be counted starting from the foremost window. Moreover, when multiple windows are overlapped, the information processing device 100 moves recently activated (manipulated) windows closer to the foreground. Accordingly, the window displayed in the foremost position is the window that is presently active.

When windows are displayed so that they overlap, the information processing device 100 determines display priority levels for the windows based on an external device(s) in the vicinity of the device 100 and the designation information described above. Processing performed by the information processing device 100 for determination of priority levels will be described below.

FIG. 5 is a flowchart showing an operation performed by the controller 11 of the information processing device 100. The operation results from one of the functions of a mutitasking OS and starts in response to an occurrence of predetermined events or operations. The events may include an operation of displaying a new window in response to a user's operation, an operation of detecting an external device, and other operations. Alternatively, the operations may be initiated regularly at a predetermined time period regardless of an occurrence of an event.

As shown in the figure, the controller 11 detects an external device capable of communicating with the information processing device 100 (Step S1). Specifically, the controller 11 recognizes existence of an external device capable of communicating with the short-range wireless communication unit 15 or the electronic tag 16. Accordingly, the controller 11 determines whether there is a detectable external device upon the recognition of the existence of the external device (Step S2).

If there is a detectable external device (Step S2: YES), the controller 11 obtains identification information of the detected external device (Step S3). By doing so, the controller 11 recognizes an external device, which device has been detected. The controller 11 obtains device information from an external device via the short-range wireless communication unit 15 or the electronic tag 16 upon detection of the external device or during communication with the external device. The controller 11 may employ the obtained device information to be stored in the EEPROM 11*d* as information (hereinafter referred to as connection information) representative of an external device, which is currently communicating with the information processing device 100. Specifically, the controller 11 may store the obtained device information or an ID of the external device corresponding to the obtained device information as connection information. In this case, the controller 11 can obtain identification information by reading connecting information. Also, the controller 11 deletes identification information of an external device from connection information when the external device is no longer detected.

Upon obtaining the identification information, the controller 11 determines the display state of the windows in the display 14 and identifies windows that are displayed with overlap (Step S4). At such time, the controller 11 determines as to which portion of the windows overlap based on the stored window information. Here, windows that interfere with the display of other windows and windows the display of which is impeded by other windows are identified by the controller 11 as windows with overlap. Namely, in a case of multiple windows with overlap, the controller 11 determines that both windows displayed in the foreground and windows displayed in the background are windows with overlap. A similar operation is carried out in cases where three or more windows overlap in a certain area.

Thereafter, the controller 11 determines whether the windows identified in Step S4 are present and thereby determines whether windows with overlap are present (Step S5). If it is determined that there are windows displayed with overlap (Step S5: YES), the controller 11 identifies applications corresponding to the identified windows and identifies an external device associated with the identified application (Step S6). Specifically, the controller 11 reads an ID associated with an application being displayed in the identified window by referring to designation information and identification information, so as to identify respective device information. If the identification information includes a property, the controller 11 identifies the property. The controller 11 performs the identification described above for every window that has an overlapping portion. Since a window corresponds to a particular application, device information associated with an application can be construed as device information associated with a respective window.

Upon completion of identification of device information for each of the windows having overlapping portions, the controller 11 determines whether the windows include a window associated with identification information of a detected external device (Step S7). Specifically, the controller 11 reads a piece of device information that corresponds to a window of the overlapping windows from the designation information and determines whether an external device identified by the device information is detected in Step S1.

When there is a window associated with the detected external device, the controller 11 checks whether there is another window associated with the detected external device (Step S8). When multiple windows are associated with the detected external device (S8: YES), the controller 11 determines a window having the highest order of the designation information from among the multiple windows (Step S9).

Next, the controller 11 determines whether a target window is being displayed in the background (Step S10). It is noted that the target window is the window detected in Step S9 or a single window in a case where only the single window is associated with the information processing device. The controller 11 determines one or other of the above-described windows to be the target window in Step S10. When the target window is being displayed in the background (Step S10: YES), the controller 11 changes an order of windows displayed by outputting display data corresponding to the changed display order, so as to cause the target window to be displayed in the foremost position (Step S11).

It is to be noted that when the determinations in Steps S2, S5, S7, or S10 are negative, the controller 11 ends the process without changing a display order. This is because it is assumed that the target window has already been displayed in the foremost position.

Figure 6:
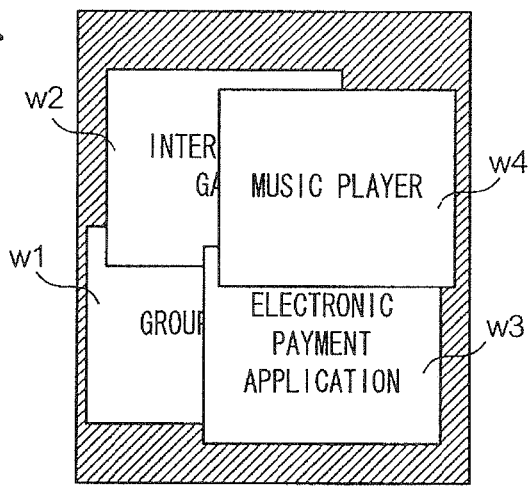
FIG. 6 shows an example of a screen on which windows are displayed.

An operation described in the foregoing embodiment will now be described in detail with reference to some examples of display of windows. In this example, the identification information and designation information are provided as shown in FIGS. 3 and 4. The windows of the groupware, interactive game application, electronic payment application, and music player are referred to hereafter as "W1," "W2," "W3," and "W4," respectively. Assuming that the windows overlap with other windows an initial condition of the display screen before initiation of the process shown in FIG. 5 is shown in FIG. 6. In the same figure, an area indicated by hatched lines is a screen of the display 14 within which a window can be displayed.

Figure 7:
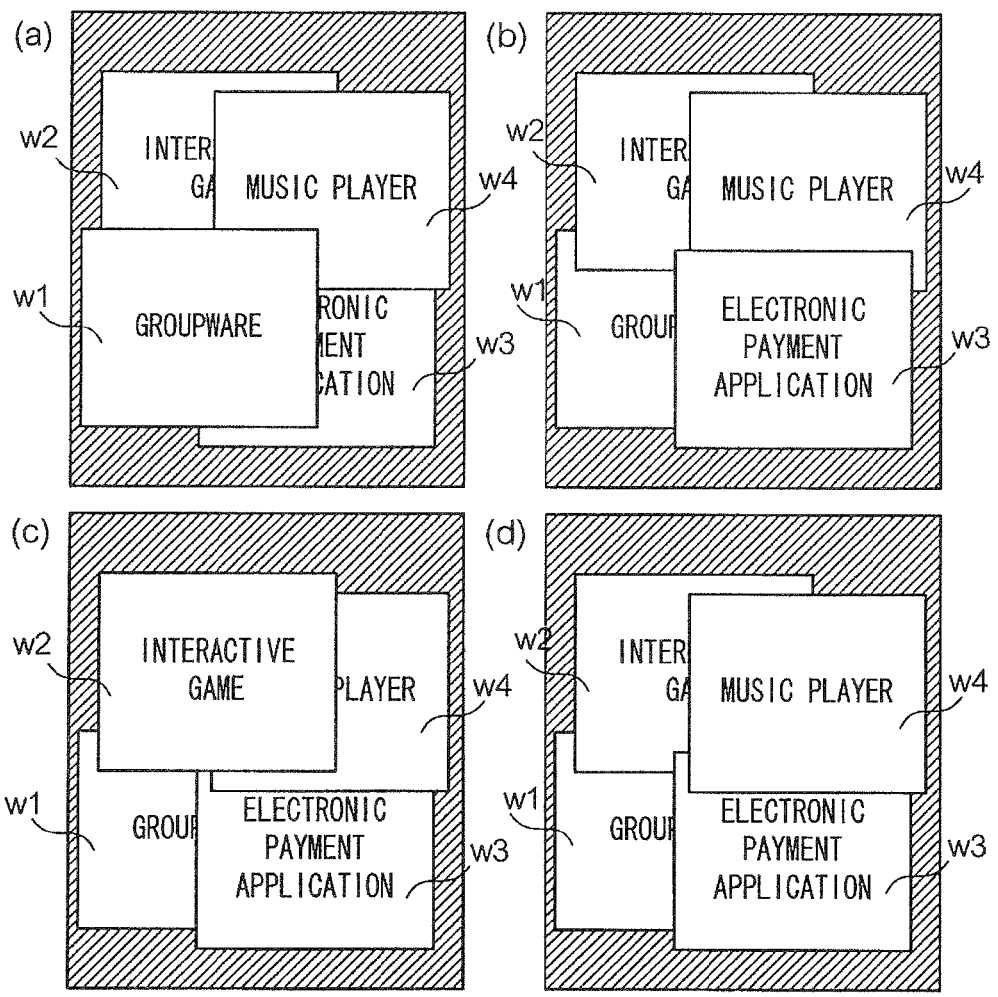
FIG. 7 shows another example of a screen on which windows are displayed.

For example, when the information processing device 100 is situated in an Office where the mobile phones B through F owned by the user's colleagues and the information processing device 100 detects at least a mobile phone, the controller 11 changes the screen of the display 14 to a screen as in FIG. 7(*a*). Thus, the controller 11 causes the window W1 of the groupware in which the mobile phone owned by a colleague is indicated by the designation information to appear in the foremost position in the screen. When a user puts the information processing device 100 over the reader/writer to change an electronic value, the controller 11 changes the screen of the display 14 to a screen as in FIG. 7(*b*). Thus, the controller 11 causes the window W3 of the electronic payment application in which the reader/writer is indicated by the designation information to appear in the foremost position in the screen. Similarly, when the mobile phone A owned by an opponent of a game is situated within a range communicable with the information processing device 100, the controller 11 causes the window W2 to be displayed in the foremost position as shown in FIG. 7(*c*). When a wireless headphone is situated within a range communicable with the information processing device 100, the controller 11 causes the window W4 to appear in the foremost position as shown in FIG. 7(*d*).

It is to be noted that screens shown in FIG. 7 (*d*) and FIG. 6 are the same. In this case, the controller 11 does not change an order of display of windows since the window W4, which must be displayed in the foremost position, has already been displayed in the foremost position. This case corresponds to "NO" in step S10.

In the operation described in the foregoing, upon detection of an external device, the information processing device 100 according to the present exemplified embodiment displays a window associated with the external device with higher priority. Upon detection of a predetermined external device near the information processing device 100, the information processing device 100 displays a whole window, which is highly likely to be selected by a user. As a result, the information processing device 100 enables a user to perform smoothly an operation with the window. In other words, the information processing device 100 reduces the necessity of a user having to perform an operation for displaying a window of an application associated with a detected external device. As a result, a workload of a user in operating the information processing device 100 is reduced. Effects of the reduced operation according to the present invention will become significant in a case where a multi-tasking process is carried out on a portable electronic appliance including a mobile phone, which has a limited size display and input devices.

In the information processing device 100 according to the present exemplified embodiment, a property of an external device is provided. Accordingly, if there are detected external devices having the same function, prioritization of displaying windows based on the properties of the windows will be realized. For example, when a mobile phone of a colleague is situated near the information processing device 100 a window of the groupware is displayed in the foremost position, whereas when a mobile phone of an opponent is situated near the information processing device 100, a window of the interactive game application in which the opponent is active is displayed in the foremost position. In another example, different windows are displayed in the foremost position based on properties of detected reader/writers. Specifically, the information processing device 100 performs pre-paid type electronic payment at a reader/writer installed at an entrance gate of a station, whereas it performs another electronic payment at a reader/writer installed at a shop.

In the information processing device 100 of the present exemplified embodiment, it is possible to control display of windows based only on a detection of an external device. In other words, the control is independent as to whether an application is running. For example, when the information processing device 100 is situated at a position where a reader/writer can be detected, it is possible to display an application for performing electronic payment so as to enable a user to check the balance of a user's electronic value either after or before completion of a payment.

Figures 8, 9:
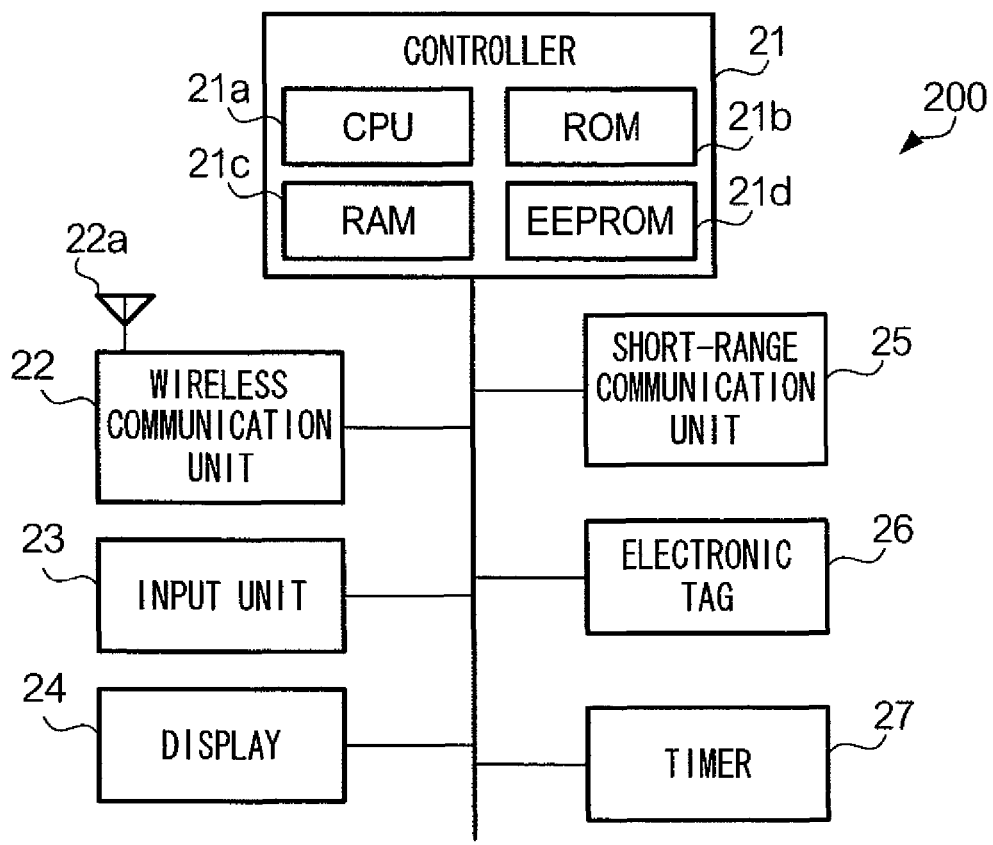
FIG. 8 is a block diagram showing a configuration of the information processing device according to the present invention.
FIG. 9 exemplifies designation information.

FIG. 8 is a block diagram showing an information processing device according to the second exemplary embodiment of the present invention. As shown in the figure, the information processing device 200 includes a controller 21, wireless communication unit 22*m*, input unit 23, display 24, short-range wireless communication unit 25, electronic tag 26, and timer 27.

In the information processing device 200 of the second exemplary embodiment, elements with the same reference numerals as of the information processing device 100 of the first exemplary embodiment refer to like elements. It is to be noted that data stored in the controller 21 differs in part from the data stored in the controller 11. In this regard, a description hereinafter will be directed to a configuration specific to the second exemplary embodiment and a description about a configuration similar to the first exemplary embodiment will be omitted.

The timer 27 includes an internal clock and outputs time information representative of a present time to the controller 21. The timer 27 continues to measure time even when the information processing 200 is turned off. The controller 21 may obtain time information from the timer 27 only when necessary. Alternatively, the controller 27 may obtain time information when the information processing device 200 is turned on, and updates the obtained timing information in the future by only the information processing device 200.

FIG. 9 exemplifies designation information according to the present exemplified embodiment. In the figure it is assumed that the identification information of the present exemplified embodiment is the same as that of the first exemplary embodiment shown in FIG. 3. In the present exemplified embodiment, the designation information is data including data items such as "time period" as well as "application name," "device information," and "order." Thus, the designation information of the present exemplified embodiment specifies a corresponding external device and a time period, with regard to each application. "Time period" represents a day and time, by which it is identified whether a present time is included in a time period during which an association with an external device is valid.

In the present exemplified embodiment, the designation information specifies a time in which an application is used most frequently. For example, a groupware is generally used in an office. In this regard, "time period" for the groupware is set to office hours, i.e., "9:00-18:00." An interactive game application and music player are generally used outside office hours. In this regard, "18:00-23:00" is set for the interactive game application and music player. As for an application, which can be used any time of the day including an electronic payment application, the time period is set to "0:00-24:00."

Figure 10:
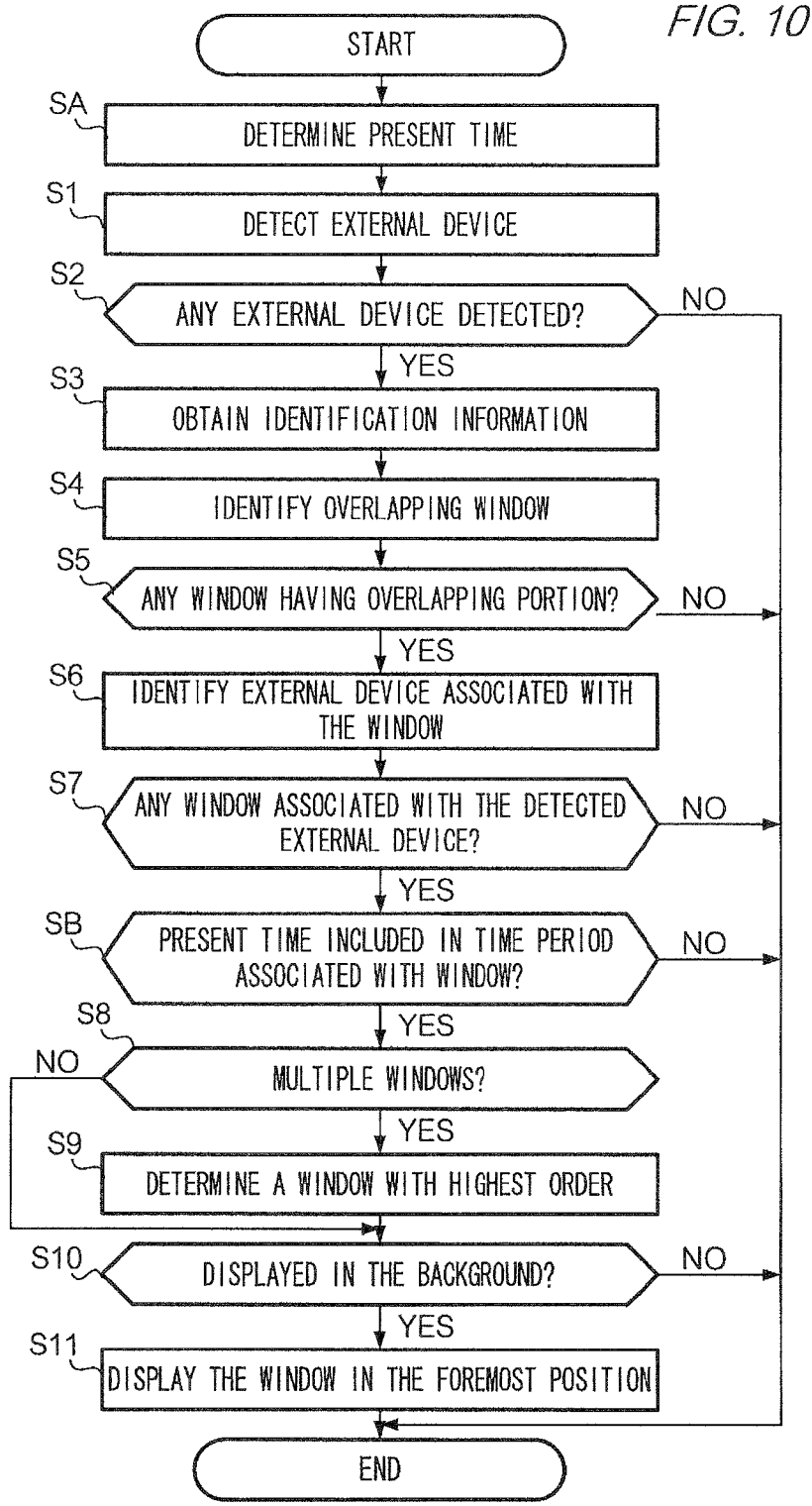
FIG. 10 is a flowchart showing an operation of the information processing device.

The features in the forgoing description are attributed to a configuration of the information processing device 200 of the present exemplified embodiment. In the configuration, the information processing device 200 determines priority levels of windows to be displayed. FIG. 10 is a flowchart showing an operation of the controller 21 of the information processing device 200. In the same figure, steps referred to by the same numerals as in FIG. 5 indicate that the steps are the same as those of the first exemplary embodiment. Simply put, only the steps SA and SB are characteristic processes of the present exemplified embodiment and the other processes are the same as those of the first exemplary embodiment.

In the step SA, the controller 21 determines a present time based on the time information output by the timer 27. In the step SB, the controller 21 determines whether the present time is in the time period associated with a window, for which the identification information of the detected external device is determined in Step S7. If the present time is included in the time period, the controller 21 performs processes of Step S8 and the following processes. If the present time is outside the time period, the controller 21 terminates the process without changing the display of windows.

By performing the processing described in the foregoing embodiment, upon detection of a pre-specified external device in a predetermined time, the information processing device 200 of the present exemplified embodiment displays on a priority basis a window of an application associated with the detected external device. By doing so, it is possible for information processing device 200 to display a window, which is suitable for a usage condition of a user. For example, it is natural to display a window of an application such as a groupware during office hours but it might not be preferable to display such an application outside office hours. In this regard, in the first exemplary embodiment a window of a groupware is displayed in the foremost position when a user is socializing with his/her colleagues outside office hours. In the present exemplified embodiment, a time period representative of a time during which a window should be displayed is included in the designation information. As a result, display of the window at an inappropriate time is prevented.

Also, the information processing device 200 of the present exemplified embodiment will be effective in a case where two or more priority levels are given in a single external device, for example, if a person is a user's colleague and is also an opponent active in an interactive game application. In this case, it is possible to set a user's office hours for a "time period" with regard to a groupware, whereas a "time period" anytime outside the office hours may be set with regard to an interactive game application. If there is an external device to which two more or more properties are provided near the information processing device 200, it is possible to display windows corresponding to a present time in the foremost position.

A "time period" specified by the designation information is not limited to being set by specifying a starting point and an end point of the period. For example, it is possible to specify a time period as business days (i.e., Monday to Friday) and weekdays (i.e., Saturday and Sunday). Alternatively, it is possible to specify the "time period" on a monthly or a yearly basis.

The present invention can be implemented in different ways to the exemplary embodiments described above. For example, the present invention can be implemented in alternative embodiments. Additionally, the alternative embodiments shown below can be combined with each other as appropriate.

Alternative Embodiment 1

It is possible to include the number of external devices having a same property in a condition for giving a priority of displaying a window. For example, it is possible to allow a window of a groupware displayed in the foremost position by the controller only when a predetermined number (for example, three) of mobile phones whose priorities are set to "colleague" are detected. By doing so, a window is prevented from being automatically displayed in the foremost position in a case where a display of the window is inappropriate. For example, when a user meets a colleague in the office by accident, appearance of a window of a groupware in the foremost position is prevented.

It is possible to modify the alternative embodiment 1. For example, when the controller is displaying a window of an interactive game application and the game is designed to start when four or more participants are gathered, it is possible to display the window in the foremost position when four or more mobile phones having the property "colleague" are detected.

Alternative Embodiment 2

In some of the above-described embodiments, the controller only determines a window that is to be displayed in the foremost position. In other words, the first and second exemplary embodiments are silent about a determination on orders of other windows. However, the controller may determine a property of each overlapping window based on the designation information described above, and display windows such that a window with a higher priority level is displayed further forward than a window having a lower priority level. By doing so, if a user's preferred window is not displayed in the foremost position a user can view the preferred window by performing an easy operation. It is to be noted that the "operation" described above refers to close, minimize, or other operations with regard to a window displayed in the foremost position.

In this case, the controller determines priority levels of windows based on device information and order information associated with applications. Hereinafter, we will take a case in which multiple windows sharing overlapping portions are displayed where some of the windows are associated with a detected external device, and others are not in association with an external device.

Figures 11, 12:
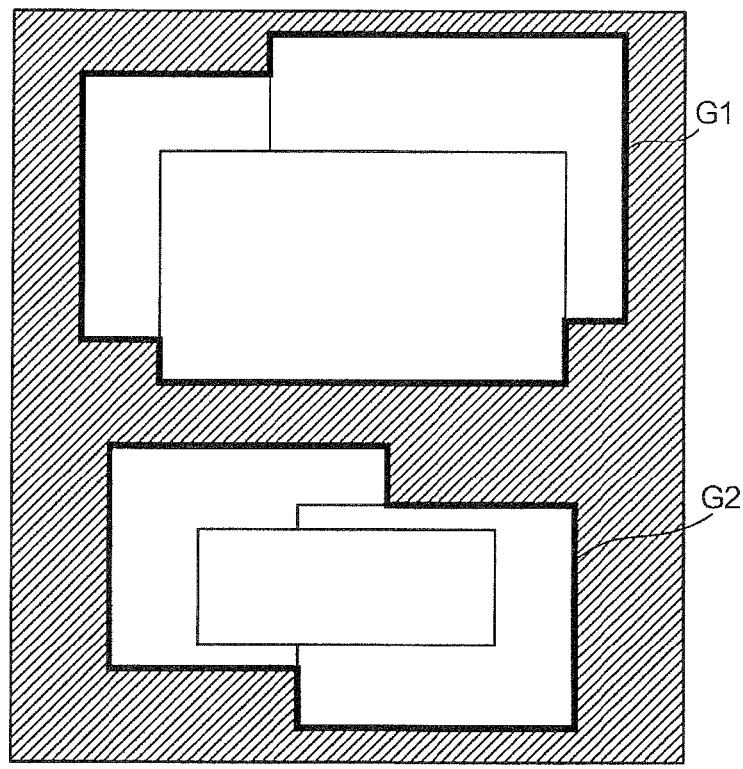
FIG. 11 illustrates a control for determination of priority levels.
FIG. 12 shows yet another example of a screen on which windows are displayed.

Specifically, it is assumed that the windows wa, wb, wc, wd, we, and wf which are associated with a certain application, are displayed so that they overlap with each other as shown in the FIG. 11. Also, it is assumed that the windows wa, wb, and we are associated with a detected external device, whereas the windows wd, we, and wf have no association with an external device.

In this case, the controller firstly gives the windows wa, wb, and we, which have association with the detected external device, priority levels higher than that given to the windows wd, we, and wf. Next, the controller determines a priority for each of the windows wa, wb, and we based on their orders. Similarly, the controller determines a priority for each of the windows wd, we, and wf based on their orders. As a result, the priority levels determined by the controller are shown in FIG. 11. The controller displays a window having the highest priority in the foremost position.

Alternative Embodiment 3

The controller may notify an external device of results of the display control described above after completion thereof. For example, when an external device shares a communication interface with the information processing device and is capable of executing an application and displaying an outcome of the application in a window, the information processing device may notify the external device of a window currently displayed in the foremost position. For example, in the first exemplary embodiment, a window of the interactive game application is displayed in the foremost position by the information processing device; the information processing device may notify the mobile phone A detected by the information processing device of the window displayed in the foremost position. By doing so, it is possible to recognize that the interactive game application is ready to be initiated at the mobile phone A.

Alternative Embodiment 4

Windows belonging to specific applications may be assigned priority levels that are permanently established and irrespective of the above-described designation information. In order to implement such an approach, it may be possible, for instance, to pre-store information designating such windows in the controller and, when such windows overlap with other windows they can be displayed based on priority levels determined irrespective of a detected external device. It should be noted that when it is desirable to display the windows of such specific applications in the foremost position, it is sufficient to maximize their priority levels in advance. If there are windows that might create problems as a result of being displayed in the background, such as extremely important messages regarding the operation of the terminal, etc., this approach makes it possible to prevent interference of display of said windows by other windows.

In other words, this alternative embodiment eliminates the windows of the designated specific applications from consideration when determining priority levels. If the multiple windows that include the designated windows overlap at such time, the controller determines the display priority for all the windows except for the designated windows, displays the designated windows in the order of the predetermined priority, and displays the rest of the windows in the order of priority determined based on the designation information. Moreover, the windows may be designated by the user.

Alternative Embodiment 5

Methods and configuration for detecting an external device are not limited to those described in the foregoing embodiments. For example, if each user carries a mobile phone (i.e., an example of the external device) in which an electronic tag is implemented in an office where a reader/writer is employed for presence management, the information processing device may obtain from the reader/writer identification information of mobile phones, to detect external devices in the office and calculate the number of the external devices. More specifically, it is possible to install the reader/writer at an entrance of the office, so that office workers cannot enter or leave the office without putting a mobile phone over the reader/writer. In this case, the reader/writer is capable of obtaining identification information for identifying mobile phones to identify a user in the office and the number of the users.

Alternative Embodiment 6

In the present invention, there may be more than one window displayed in the foremost position. For example, as illustrated in the example of FIG. 12, if the windows can be classified into multiple groups, the controller may determine the windows displayed in the foremost position in each one of the respective groups. It should be noted that in this case the term "group" refers to a set of windows contained within an area defined by a single closed contour line. In the example depicted in FIG. 12 the windows can be classified into the groups G1 and G2. In such a case, the controller may determine the windows displayed in the foremost positions in both groups, i.e. the groups G1 and G2. It should be noted that in this case the foremost window of each group may be an active window. In other words, in the present invention, the display screen may be partitioned into predetermined areas, and the foremost window or the display priority of the windows may be determined in each respective area.

Figure 13:
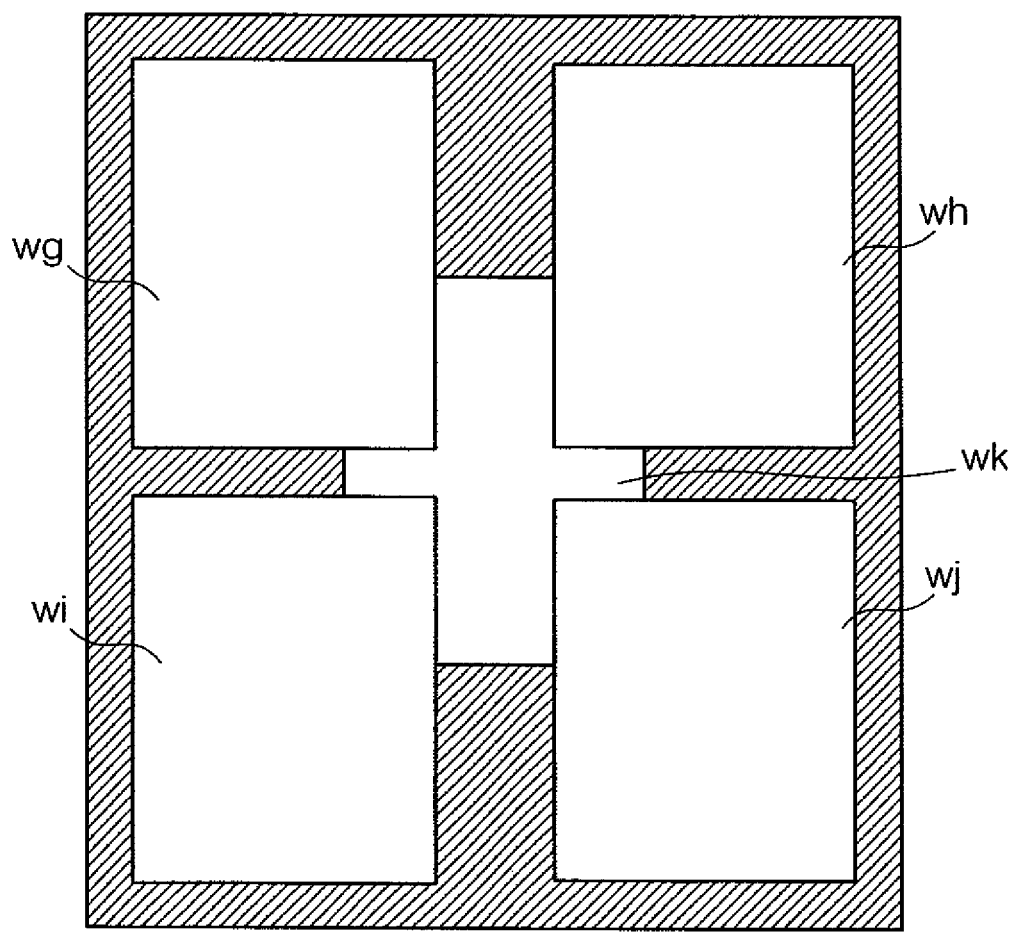
FIG. 13 shows yet another example of a screen on which windows are displayed.

Further, in the present invention, when there are multiple, mutually non-overlapping windows all of which are associated with a detected external device, all of the windows are caused to appear in the foremost position. For example, FIG. 13 shows the windows wg, wh, wi, and wj. Although there is an overlapping window wk, the windows wg, wh, wi, and wj do not overlap. In this case, when the priority levels of the windows wg, wh, wi, and wj are associated with a detected external device, all of the windows wa, wb, wc, and wd are displayed in the foremost position.

Alternative Embodiment 7

In the first and second exemplary embodiments described above, a window is associated with a single application. In the present invention, an association between windows and an application is not limited to the one described in the foregoing embodiments.

For example, an application with a multiple document interface (MDI) is capable of displaying multiple windows. It is possible to adapt the present invention to an application with MPI by defining its association to an external device with regard to each of the windows corresponding to the application. For example, in an application such as a tab browser, each window is associated with an external device, and a window displayed in the foremost position is determined based on the association.

Alternative Embodiment 8

While in the above-described embodiments the present invention is applied to a mobile phone, it is possible to apply the present invention to other information processing devices. The present invention is applicable to various information processing devices that display windows, such as PDAs (Personal Digital Assistants) and other communication terminals, personal computers, etc.

Alternative Embodiment 9

In the above-described embodiments the present invention is implemented as a feature of the OS. The present invention, however, can also be implemented as a standalone application. Moreover, the functionality of the present invention can be added to an existing OS or application in the form of a so-called plug-in. When such a configuration is used, the present invention can be provided as an application program for implementing the above-described functionality on a computer (information processing device). Such a program can be provided in the form of a program stored on a recording medium such as an optical disk, etc. or provided via a network, such as the Internet, by a predetermined server apparatus.

Alternative Embodiment 10

It is to be noted that the configuration of the information processing device shown in FIGS. 1, 2, and 8 and the like is merely an exemplified embodiment of software and hardware implementations. Thus, it is possible to employ other software and hardware implementations adapted to perform window controls of the present invention described above.

While alternative embodiments have been shown and described, one skilled in the art will recognize that other embodiments are also possible.

What is claimed is:

1. An information processing device comprising:
a memory in which an association between a window and an external device is defined;
a detecting section that detects at least one external device;
an obtaining section that obtains identification information for identifying the external device, wherein the identification information includes information on a functionality implemented by an application program installed in the external device, the functionality including an application for settling payments and groupware;
a designating section that designates the identification information of a window displayed in a display;
an identification section that identifies a first window overlapping with a second window being displayed in the display;
a determination section that determines, upon detection of an overlapping of displayed windows, user pre-defined priority levels of a plurality of windows identified by the identification section referring to the memory, such that a priority level of a window associated with the external device is determined to be higher than a priority level of a window not associated with the external device;
a display controller that displays windows with a higher priority level determined by the determination section in front of windows with a lower priority level, determined by the determination section; and
a window designation section that designates at least one window, wherein when a window designated by the window designation section is included in the plurality of windows, the display controller displays the designated window in a foremost position,
wherein
when a number of external devices detected by the detecting section is greater than a predetermined number and the detected external device has the same functionality as the information processing device, the determination section accords a priority level to a first window for which the identification information includes the functionality, the priority level accorded to the first window is higher than priority levels accorded to others of the designated windows.

2. The information processing device according to claim 1, further comprising:
a time determining section that determines a time; and
a time specifying section that specifies a time period for a window displayed in the display,
wherein when the time period specifying section specifies a time period including a time determined by the time determining section for a window, for which the identification information of the external device detected by the detecting section is designated by the designating section, the determination section accords the window a priority level higher than a priority level accorded to the window in case the time period is not included in the time period.

3. The information processing device according to claim 1, further comprising:
a communication section that communicates with the external device; and
a notification section that notifies the external device via the communication section, wherein:
the communication section obtains identification information from the external device; and
when identification information is designated by the designation section for a window having the highest priority level among the priority levels determined by the determination section, the notification section notifies an external device from which the identification is obtained.

4. A method for displaying a window based on a priority of the window, the method comprising:
defining, in a memory, an association between a window and an external device;
detecting, with a detecting section of an information processing device, at least one external device;
obtaining identification information for identifying the external device;
designating the identification information of a window displayed in a display of the information processing device, wherein the identification information includes information on a functionality implemented by an application program installed in the external device, the functionality including an application for settling payments and groupware;
identifying, with an identification section of the information processing device, a first window overlapping with a second window being displayed in the display;
determining, upon detection of an overlapping of displayed windows, user pre-defined priority levels of a plurality of windows identified by the identification section referring to the memory, such that a priority level of a window associated with the external device is determined to be higher than a priority level of a window not associated with the external device;
displaying windows with a higher priority level determined by a determination section of the information processing device, in front of windows with a lower priority level determined by the determination section; and
designating at least one window, wherein when a designated window is included in the plurality of windows, the designated window is displayed in a foremost position,
wherein
when a number of external devices detected by the detecting section is greater than a predetermined number and the detected external device has the same functionality as the information processing device, a first window for which the identification information includes the functionality, a priority level accorded to the first window is higher than priority levels accorded to others of the designated windows.

* * * * *